Feb. 20, 1923.

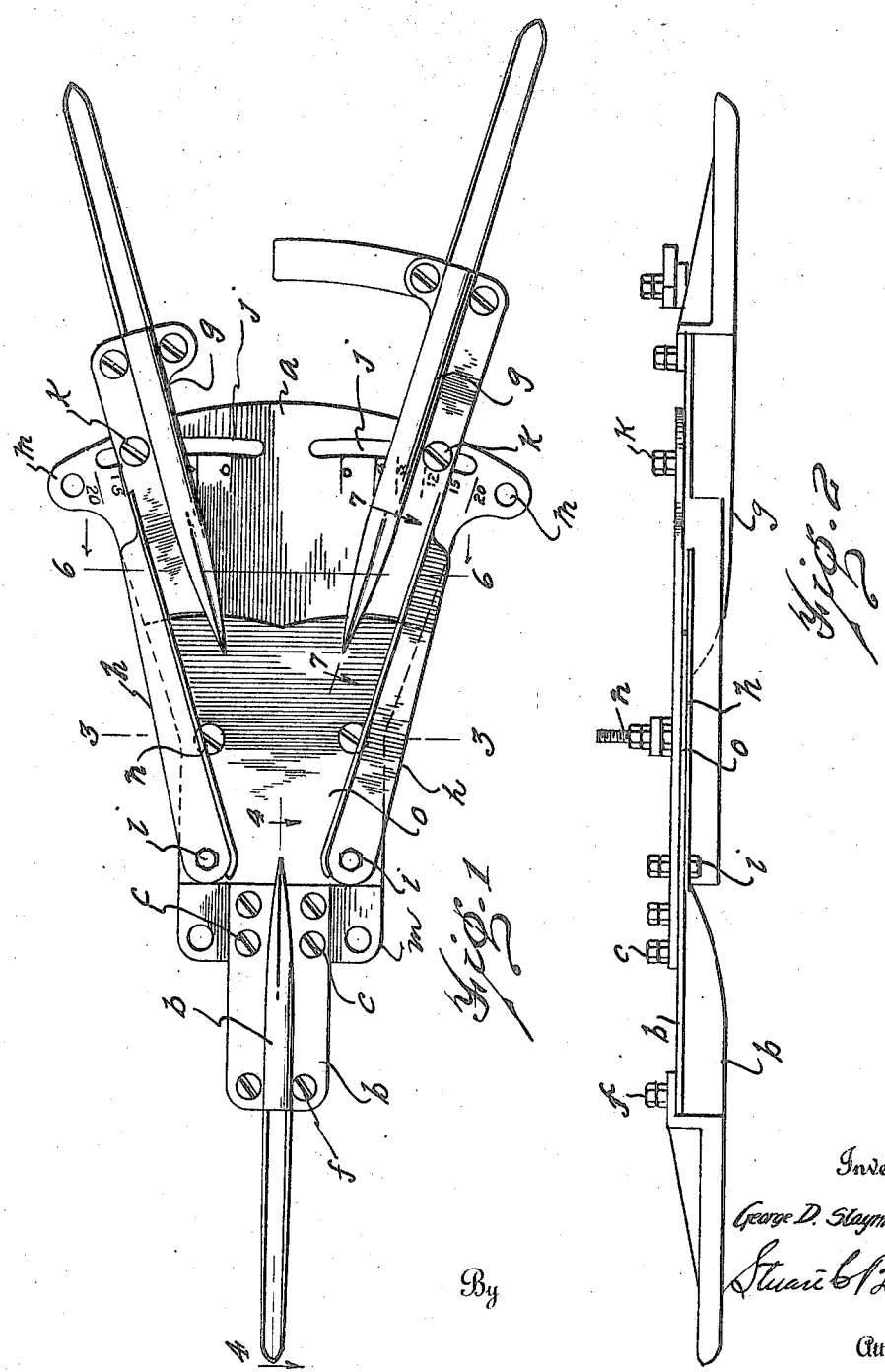

G. D. SLAYMAKER.
TROLLEY WIRE FROG.
FILED JAN. 12, 1922.

Inventor
George D. Slaymaker
By Stuart C. Barnes
Attorney

Patented Feb. 20, 1923.

REISSUED AS NO. 15986

1,445,855

UNITED STATES PATENT OFFICE.

GEORGE D. SLAYMAKER, OF DETROIT, MICHIGAN, ASSIGNOR TO SLAYMAKER ELECTRIC WELDING COMPANY, OF DETROIT, MICHIGAN, A CORPORATION OF MICHIGAN.

TROLLEY-WIRE FROG.

Application filed January 12, 1922. Serial No. 528,592.

*To all whom it may concern:*

Be it known that I, GEORGE D. SLAY-MAKER, a citizen of the United States, residing at Detroit, in the county of Wayne and State of Michigan, have invented certain new and useful Improvements in Trolley-Wire Frogs, of which the following is a specification.

This invention relates to trolley wire frogs or switches, and has for its object a trolley wire frog provided with adjustable runners which are renewable whenever this is deemed expedient. This frog is also provided with a removable pan which consists of a wear piece between the runners and is easily removed without renewing the entire device. Furthermore, the runners and pan are supported below the main plate so that the runners and pan may be easily removed from the plate without in any way disturbing the support of the plate upon the guy wires and poles. This is an important feature as these guy wires are always under a certain prescribed tension and it is very inconvenient and troublesome to remove the entire frog and replace it. By the arrangement of my runners it is possible to remove both the runners and the pan without in any way disturbing the support of the frog upon the guy wires.

Another feature of my invention is the adjustability of the runners with respect to one another. The two movable or spur runners can be swung around on the main supporting plate each through a considerable arc yet always remain in position, which permits the trolley wheel to travel from the stationary runner to either of the spur runners, or vice versa, depending, of course, upon the path taken by the car beneath. This permits the use of a single type of frog for various angularities of the spur line with respect to the main line and hence it is not necessary to have numerous patterns or dies to take care of all desired angles.

In the drawings,—

Fig. 1 is an inverted plan view of the frog.

Fig. 2 is a side elevation of the same.

Figure 4:
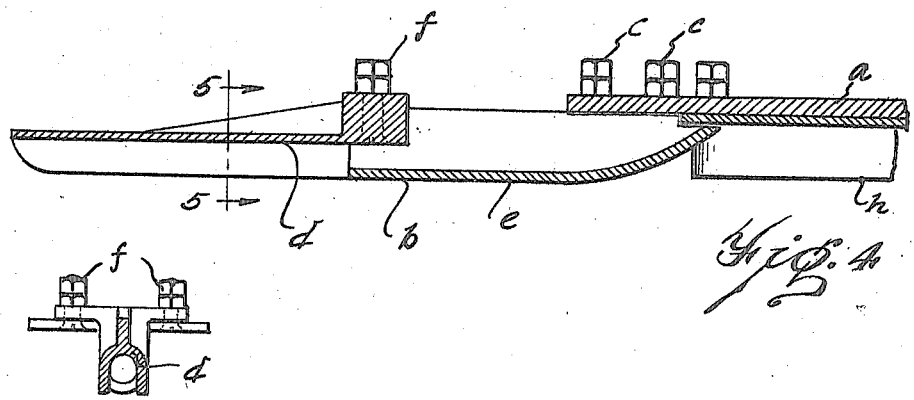
Fig. 4 is a section on the line 4—4 of Fig. 1.
Figures 5, 6:
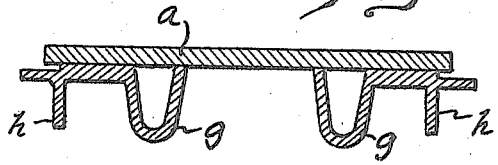
Fig. 5 is a section on the line 5—5 of Fig. 4.
Fig. 6 is a section on the line 6—6 of Fig. 1.
Figure 7:
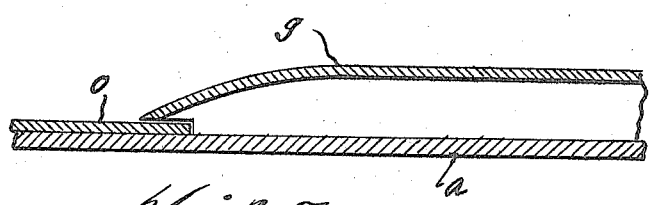
Fig. 7 is a section on the line 7—7 of Fig. 1.

$a$ designates the main supporting plate. To this is bolted the stationary or main runner $b$ by the bolts $c$. This main runner is shown in detail in Fig. 4. It will be seen that it is provided with an end piece $d$ which is bolted to the body of the runner $e$ by the bolts $f$. The trolley wire is clamped and crimped between the end piece and the body of the runner when the two are clamped together and thereby the trolley wire is firmly held to the runner and the channel sides of the end piece are hammered in upon the wire. The same construction is used in all the runners so far as clamping the body and the channel together and crimping and pinching the trolley wire.

The spur or adjustable runners $g$ are not clamped to the trolley plate the same way. They are carried on the radius arms $h$ which have their centers at $i, i$. The runners and the runner points are somewhat offset from the main axes of the radius arms, as is clearly shown in Fig. 1. Each of the centers $i, i$, is substantially on a perpendicular line through the point of the stationary runner $b$—perpendicular to the axis of the stationary runner. Each of these centers is as close on either side of the point of the main runner as is feasible and still allow the radius arms to be cleared by the flanges of the trolley wheel. This results in the points of the swinging or spur runners swinging on arcs approximating an arc whose center is at the point of the main runner. For all practical purposes this arrangement of the radius arms with the offset swinging runners works just as well as though the points of the swinging runners did actually swing on an arc whose center was at the point of the main runner.

The main plate is provided with a pair of segmental slots $j$ through which engage the bolts $k$ by which the swinging runners may be clamped tightly in any given position of adjustment. The main plate $a$ is somewhat segmental in form and is provided at the four corners $m$ with perforations to receive the guy wires.

It will be apparent that the main or stationary runner can be removed by loosening and removing the bolts $c$ while the swinging runners can be removed by taking out the bolts $k$ and the pivot bolts $i$. The pivot bolts $i$ also in connection with the bolts $n$ serve to hold the pan or the wear plate $o$ in place. Hence this pan may be easily removed when it wears out. All these adjustments and removals can be made without in any way altering the support of the main plate upon the guy wires.

Figure 3:
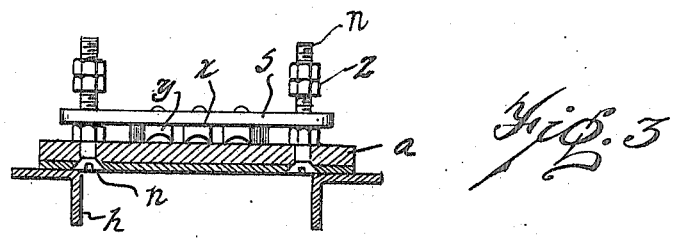
Fig. 3 is a section on the line 3—3 of Fig. 1.

In Fig. 3 the clamp for the trolley wire is shown. One trolley wire passes out through the opening in the top of the main runner across the top of the supporting plate and through the center blocks $x$ into one of the adjustable runners. The other wire passes out of the adjustable runner and into one of the clamping blocks and the end is then usually turned around and used as a guy wire to one of the poles. The clamping blocks are forced down against the wires by the nuts $z$ engaging against the clamping bars.

What I claim is:

1. A trolley wire frog, having in combination, a main plate, and one or more runners removably secured to the under side of the main plate and comprising each a body portion and an end piece clamped together to hold the trolley wire to the runner.

2. A trolley wire frog, having in combination, a main plate, a plurality of runners removably secured to the under side of the main plate, and a wear piece secured to the under side of the main plate and removable when the said runners have been removed from the main plate.

3. A trolley wire frog, having in combination, a main plate, a plurality of runners bolted to the under side of the main plate so the same can be removed without disturbing the supports of the main plate, and a wear piece secured to the under side of the main plate and which can be removed when the runners are removed without disturbing the supports of the main plate.

4. A trolley wire frog, having in combination, a main plate, a main runner supported on the said plate, and one or more swinging runners supported on the main plate and adjustable on arcs which approximate a coincidence with respect to an arc whose center is at the point of the main runner.

5. A trolley wire frog, having in combination, a main plate, a stationary or main runner supported on the main plate, and one or more swinging or adjustable runners supported on a radius arm or arms which have their center or centers closely adjacent the side or sides of the point of the main runner but sufficiently spaced to permit clearance for the flanges of the trolley wheel.

6. A trolley wire frog, having in combination, a main plate, a main runner supported by the same, and a swinging or adjustable runner supported on a radius arm whose center is closely adjacent at one side of the point of the main runner, the swinging runner being offset at one side of the radius arm so that the point of the swinging runner in swinging through an arc approximates an arc whose center would be at the point of the main runner.

7. A trolley wire frog, having in combination, a main supporting plate provided with a segmental slot, a main or stationary runner supported on the under side of said plate, a radius arm supported adjacent the point of said runner on a pivot, a swinging runner supported on said radius arm at one side thereof so that the point of said swinging runner approximates an arc whose radius would have its center at the point of the main runner, and a bolt passing through said radius arm and through said segmental slot in the main plate for adjustably securing said swinging runner on the said main plate.

8. A trolley wire frog, having in combination, a main plate, a stationary runner supported on the main plate, a removable wear piece or pan bolted to the under side of the main plate, a radius arm bolted through the main plate at a point closely adjacent the point of the main runner but at one side thereof, and a swinging runner supported on said radius arm at one side thereof and in such a way that the point of the runner in swinging upon the pivot of the radius arm swings through an arc approximating an arc whose radius would have its center at the point of the main runner.

In testimony whereof I affix my signature.

GEORGE D. SLAYMAKER.